United States Patent
Wingo

[19]

[11] Patent Number: 6,128,114
[45] Date of Patent: *Oct. 3, 2000

[54] METHOD OF AND SYSTEM FOR TRANSMITTING DATA

[75] Inventor: Dale Wingo, Richardson, Tex.

[73] Assignee: MCI Communications Corporation, Washington, D.C.

[*] Notice: This patent is subject to a terminal disclaimer.

[21] Appl. No.: 08/922,900

[22] Filed: Sep. 3, 1997

[51] Int. Cl.[7] ........................................................ H04J 14/02

[52] U.S. Cl. ............................................ 359/124; 359/173

[58] Field of Search ...................................... 359/124, 173

[56] References Cited

U.S. PATENT DOCUMENTS

| | | | |
|---|---|---|---|
| 5,777,762 | 7/1998 | Yamamoto | 359/123 |
| 5,786,913 | 7/1998 | Pfeiffer | 359/119 |
| 5,995,257 | 11/1999 | Johnson et al. | 359/127 |

*Primary Examiner*—Leslie Pascal
*Assistant Examiner*—Hanh Phan

[57] ABSTRACT

A method of and a system for transmitting a serial stream of electrical data bits by substantially simultaneously converting each bit of the serial stream of electrical data bits, or a selected subset of bits of the serial stream, into an optical bit, each optical bit having a different wavelength, and multiplexing each optical bit into a single multiwavelength optical pulse.

19 Claims, 2 Drawing Sheets

METHOD OF AND SYSTEM FOR TRANSMITTING DATA

FIELD OF THE INVENTION

The present invention relates to methods of and systems for transmitting data, and more particularly to a method of and system for transmitting serial data bits by converting data words in parallel into multiwavelength optical pulses.

DESCRIPTION OF THE PRIOR ART

Optical fiber systems have become the physical transport medium of choice in long distance telephone and data communication networks. Generally, an optical fiber system includes an optical transmitter and an optical receiver connected together by optical fiber transmission media. The optical transmitter includes a laser that produces an optical beam at a particular wavelength and a modulator that modulates the optical beam according to a serial stream of electrical data bits to produce a stream of serial optical data bits. The receiver includes an optical detector that receives the serial stream of optical data bits and converts that stream into a serial stream of electrical data bits. Currently, commercial optical transmitters and receivers can operate at data rates as high as about 9.6 gigabits per second (Gbps).

Recently, the capacity of optical fiber cables has been increased by the use of wavelength division multiplexing. In an optical wavelength division multiplexing system, optical signals with several carrier wavelengths are transmitted on the same optical fiber. Each carrier is individually modulated by a separate optical transmitter and carries different information. The individual carriers are multiplexed by a wavelength division multiplexer onto a single optical fiber. At the receiving end, a wavelength division demultiplexer separates the individual carriers. The individual carriers are received by separate optical receivers.

While wavelength division multiplexing increases fiber bandwidth by enabling a single fiber to carry multiple channels, the data rate per channel with current commercially available technology is limited by cost to about 9.6 Gbps. Thus, while a single fiber can carry over thirty 9.6 Gbps OC192 channels, which is over 3 terabits per second (Tbps), the highest data rate for transmitting a serial bit stream from one system to another system is limited to about 9.6 Gbps.

Accordingly, it is an object of the present invention to provide an optical system that can transmit and receive serial data at a data rate always higher than the repetition rate or modulation rate of optical laser transmitters.

SUMMARY OF THE INVENTION

Briefly stated, the present invention provides a method of and a system for transmitting and receiving at a distance a serial stream of electrical data bits by sequentially substantially simultaneously converting sequential sets of bits of the serial stream of electrical data bits into optical bits, each optical bit having a different wavelength, and multiplexing each optical bit of each set into a single multiwavelength optical pulse. In other words, the method and system convert the serial stream of electrical data bits into a series of parallel optical data bits. The method couples the single multiwavelength optical pulses to an optical transmission medium.

The method divides the serial bit stream into words, each of the words comprising a plurality of serial electrical bits. Then, the method substantially simultaneously converts each bit of a first of the words into an optical bit, each optical bit having a different wavelength, and then multiplexes each optical bit into a single first multiwavelength optical pulse. After converting each bit of the first word into an optical bit, substantially simultaneously converts each bit of a next one of the words into an optical bit, each optical bit having a different wavelength, and then multiplexes each optical bit of the next word into a single second multiwavelength optical pulse. Thus, the method sequentially transmits pulses, with each pulse comprising a word.

The present invention also provides a method of and system for transmitting a plurality of serial streams of electrical data bits on a single optical transmission medium by dividing each of the serial bit streams into words, each of said words comprising a plurality of serial electrical data bits, and substantially simultaneously converting each bit of a first word of each of the serial bit streams into an optical bit, each optical bit of each first word having a different wavelength. The optical bits of each of the first words at separately multiplexed into separate single multiwavelength optical pulses, and the optical pulses are spatially separated from each other for transmission on a single optical transmission medium.

The system of the present invention includes a first serial-in-parallel-out shift register including an input adapted to receive bits of a serial stream. The first serial-in-parallel-out shift register includes a plurality of outputs adapted to output a first plurality of bits of the serial data stream substantially simultaneously. A plurality of first optical transmitters, each being configured to transmit on a different optical wavelength, and each including an electrical input, are coupled to an output of the first serial-in-parallel-out shift register. Each first optical transmitter includes an optical output coupled to an input of a first wavelength division multiplexer. The first wavelength division multiplexer is coupled to a first optical transmission medium.

The system may include a second serial-in-parallelout shift register, including an input, coupled to a second serial stream, and a plurality of outputs, and a plurality of second optical transmitters coupled to a second wavelength division multiplexer. The second wavelength division multiplexer is coupled to second optical transmission medium, which is coupled to the first optical transmission medium. The first and second serial-in-parallel-out shift registers are configured to output both the first and second pluralities of bits substantially simultaneously, and the second optical transmission medium is configured to space apart on the first optical transmission medium the outputs of the first and second wavelength division multiplexers.

DESCRIPTION OF THE PREFERRED EMBODIMENT

Figure 1:
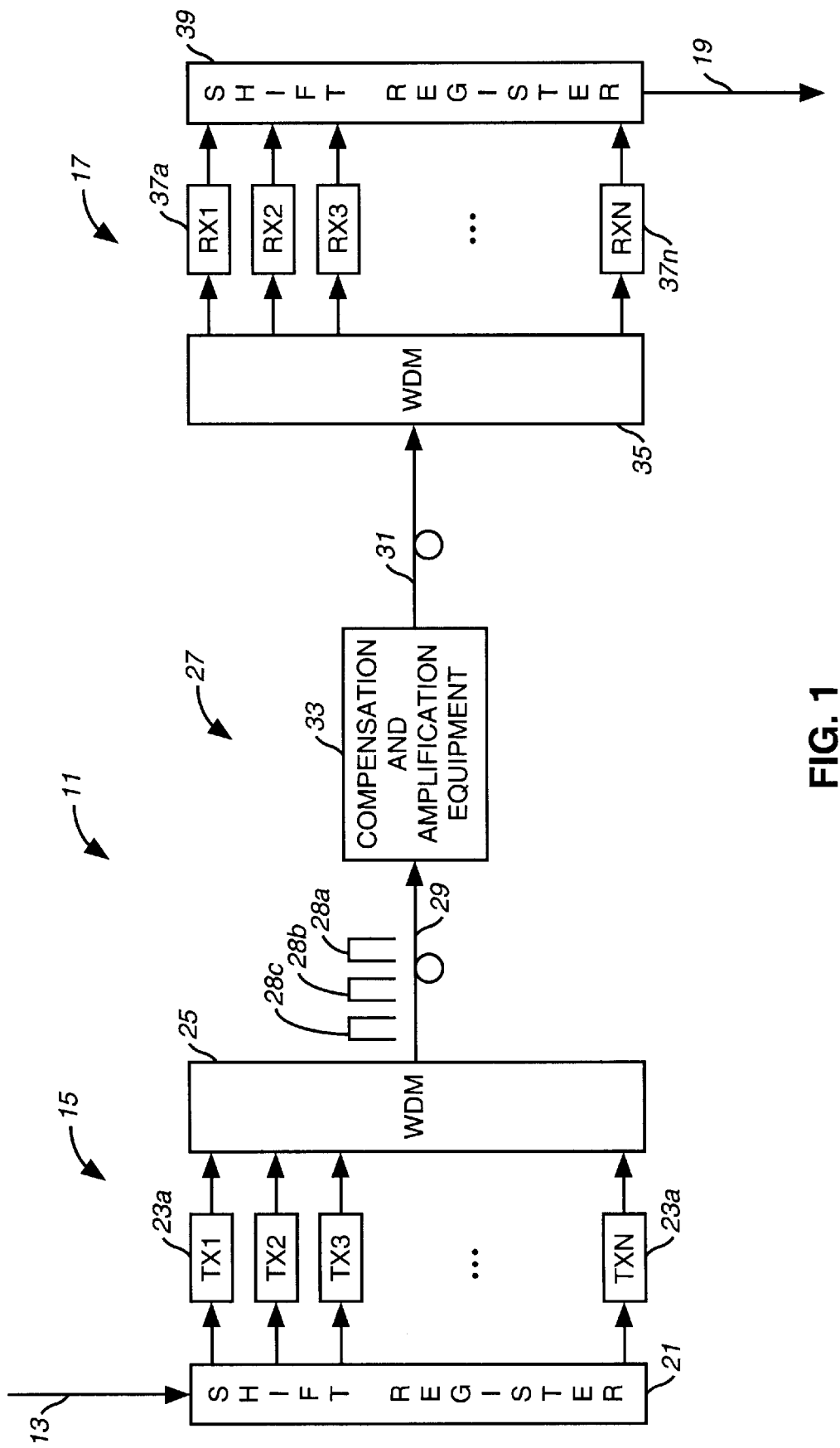
FIG. 1 is a block diagram of system according to the present invention.

Referring now to the drawings, and first to FIG. 1, an optical system according to the present invention is designated generally by the numeral 11. System 11 is adapted to transmit an incoming serial bit stream 13 from sending equipment 15 to receiving equipment 17, where an outgoing serial bit stream 19 is produced.

Sending equipment 15 includes a serial-in-parallel-out shift register 21. Serial-in-parallel-out shift register 21 includes an input, adapted to receive incoming serial bit stream 13, and a plurality of outputs. The number of outputs of shift register 21 is determined by design considerations. In an optical system that can accommodate thirty separate channels, the number of outputs may be as high as thirty. A number of bits of incoming serial bit stream 13 is loaded serially into shift register 21. When shift register 21 is loaded, shift register 21 is clocked to produce a bit at each of its outputs.

Each output of shift register 21 is coupled to the input of an optical transmitter 23. Each optical transmitter 23 is adapted to modulate an optical beam on a separate wavelength according to bits received at its input. Thus, whenever shift register 21 is clocked, each optical transmitter 23 simultaneously transmits an optical bit. The optical outputs of optical transmitters 23 are coupled to a wavelength division multiplexer 25, which combines the separate outputs of optical transmitters 23 into a single multiwavelength optical signal or pulse 28. Thus, each time shift register 21 is clocked, wavelength division multiplexer 25 produces a single multiwavelength optical pulse 28.

The output of wavelength division multiplexer 25 is coupled to optical transmission media 27, which includes at least an outgoing optical fiber 29 leading away from transmitting equipment 15, and an incoming optical fiber 31 leading into receiving equipment 17. Optical transmission media 27 preferably includes compensation and amplification equipment, indicated generally at 33, as is well known to those skilled in the art.

Receiving equipment 17 includes a wavelength division demultiplexer 35, which is optically coupled to incoming optical fiber 31. Wavelength division demultiplexer 35 is adapted to separate a multiwavelength signal received at its input into a plurality of individual single wavelength optical signals. The individual single wavelength optical signals are output at a plurality of outputs to a plurality of optical receivers 37. There are as many optical receivers 37 as there are optical transmitters 23. Each optical transmitter 37 converts an optical signal received at its input to an electrical signal at its output. The output of optical receivers 37 are coupled to the inputs of a parallel-in-serial-out shift register 39. Shift register 39 is operated to receive parallel data bits at its inputs and produce serial bit stream 19 at its output.

In operation of the embodiment of the system shown in FIG. 1, N bits of incoming serial bit stream 13 are loaded into shift register 21. Then, shift register 21 is clocked to output simultaneously a data bit to one of N optical transmitters 23. Optical transmitters 23 each simultaneously output an optical data bit, which is multiplexed into a single multiwavelength optical pulse 28 by wavelength division multiplexer 25. The single multiwavelength optical pulse 28 is carried by optical transmission media 27 to wavelength division demultiplexer 35 where it is separated into its component wavelength parts, each of which is received at an input of an optical receiver 37. Optical receivers 37 convert the N optical data bits simultaneously to N electrical data bits, which are input to parallel-in-serial-out shift register 39, which is operated to produce a serial stream of N bits.

The system of FIG. 1 is operated continuously to produce a serial stream of multiwavelength optical pulses carried by optical transmission media 27 between sending equipment 15 and receiving equipment 17. Transmitters 23 operate at the data rate of incoming serial bit stream divided by N. Thus, the system of FIG. 1 can transmit data at N times the repetition or modulation rate of the transmitters 23. For example, if N is eight and the repetition rate of the transmitters 9.6 Gbps, the data rate for the system is 78.6 Gbps.

Figure 2:
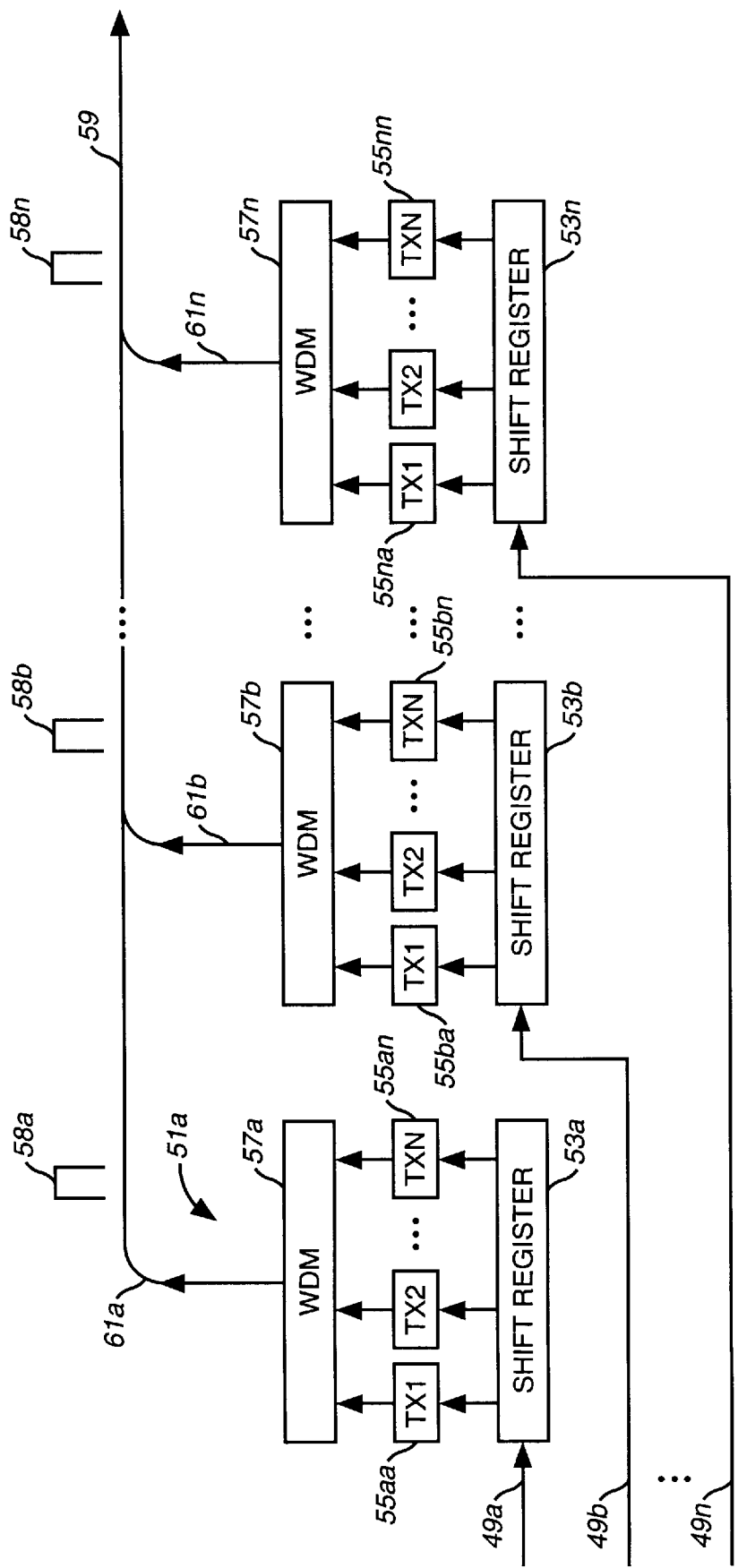
FIG. 2 is a block diagram of an alternative system according to the present invention.

Referring now to FIG. 2, there is shown an alternative embodiment of the present invention, which includes a plurality of units of transmitting equipment 51, each adapted to transmit a separate serial bit stream channel 49 on a common optical transmission medium 59. Each unit 51 includes a serial-in-parallel-out shift register 53. Each shift register 53 includes an input, coupled to a channel 49, and a plurality of outputs. Each output of each shift register 53 is electrically coupled to the input of an optical transmitter 55. The optical outputs of transmitters 55 associated with each unit 51 are optically coupled to the input of a wave division multiplexer 57. Each wavelength division multiplexer 57 produces an optical pulse 58 simultaneously with the other wavelength division multiplexers 57. The optical outputs 58 of wave division multiplexer 57 are optically coupled to optical transmission 55 by fibers 61. The lengths of fibers 61 are chosen so as to space apart optical pulses 58 produced simultaneously by units 51.

In operation of the embodiment of FIG. 2, each incoming serial bit stream 49 is received at the input of a shift register 53. When shift registers 53 are loaded, they are clocked simultaneously to output a data bit to an optical transmitter 55. Each transmitter 55 produces a simultaneous optical data bit, which is multiplexed into a single multiwavelength optical pulse 58 by a wavelength division multiplexer 57. In an eight unit 51 example, the system of FIG. 2 produces eight multiwavelength optical pulses 58 that are simultaneous in the time domain. The optical pulses are separated spatially on optical medium 59 by fibers 61.

From the foregoing, it may be seen that the present invention provides an optical system that can transmit and receive serial data at a data rate higher than the repetition rate or modulation rate of optical laser transmitters. Thus, the present invention allows an optical system to use its entire available bandwidth to transmit a serial data stream.

What is claimed is:

1. A method of transmitting a serial stream of electrical data bits, which comprises the steps of:

substantially simultaneously converting each bit of said serial stream of electrical data bits into an optical bit, each optical bit having a different wavelength; and, multiplexing each optical bit into a single multiwavelength optical pulse.

2. The method as claimed in claim 1, including the step of:

coupling said single multiwavelength optical pulse to an optical transmission medium.

3. The method as claimed in claim 2, wherein said optical transmission medium includes an optical fiber.

4. The method as claimed in claim 1, including the steps of:

demultiplexing said single multiwavelength optical pulse into a plurality of optical bits; and, substantially simultaneously converting each of said optical bits into an electrical bit of said serial bit stream.

5. A method of transmitting a serial stream of electrical data bits, which comprises the steps of:

dividing said serial bit stream into words, each of said words comprising a plurality of serial electrical bits;

substantially simultaneously converting each bit of a first of said words into an optical bit, each optical bit having a different wavelength; and, multiplexing each optical bit into a single first multiwavelength optical pulse.

6. The method as claimed in claim 5, including the step of:

coupling said first multiwavelength optical pulse to an optical transmission medium.

7. The method as claimed in claim 6, wherein said optical transmission medium includes an optical fiber.

8. The method as claimed in claim 5, including the steps of:

demultiplexing said first multiwavelength optical pulse into a plurality of optical bits; and, substantially simultaneously converting each of said optical bits into a word.

9. The method as claimed in claim 5, including the steps of, after converting each bit of said first word into an optical bit:

substantially simultaneously converting each bit of a second one of said words into an optical bit, each optical bit having a different wavelength; and, multiplexing each optical bit of said second word into a single second multiwavelength optical pulse.

10. A method of transmitting a plurality of serial streams of electrical data bits, which comprises the steps of:

dividing each of said serial bit streams into words, each of said words comprising a plurality of serial electrical data bits;

substantially simultaneously converting each bit of a first word of each of said serial bit streams into an optical bit, each optical bit of each first word having a different wavelength;

separately multiplexing the optical bits of each first word into a single multiwavelength optical pulse; and, spatially separating said single multiwavelength optical pulses from each other for transmission on a single optical transmission medium.

11. The method as claimed in claim 10, wherein said step of spatially separating said first and second single multiwavelength pulses from each other for transmission on a single optical transmission medium comprises the steps of:

coupling each of said single multiwavelength pulses to said optical transmission medium through a separate optical fiber, wherein each of said optical fibers is of a different length from the others of said optical fibers.

12. A method of transmitting serial streams of electrical data bits, which comprises the steps of:

storing a first N bits of a first serial stream in a first N bit serial-in-parallel-out shift register;

outputting the first N bits stored in said first serial-in-parallel-out shift register substantially simultaneously, each to an input of one of a set of N optical transmitters, each of said optical transmitters transmitting on a different wavelength; and, multiplexing the optical outputs of said optical transmitters onto a single optical transmission medium.

13. The method as claimed in claim 12, including the steps of, after outputting the first N bits of said first serial bit stream from said first serial-in-parallel-out shift register:

storing a second N bits of said first serial stream in said first N bit serial-in-parallel-out shift register;

outputting the second N bits stored in said first serial-in-parallel-out shift register substantially simultaneously, each to an input of one of said first set of N optical transmitters, each of said optical transmitters transmitting on a different wavelength; and, multiplexing the optical outputs of said optical transmitters onto a single optical transmission medium.

14. The method as claimed in claim 12, including the steps of:

storing a first M bits of a second serial stream in a second M bit serial-in-parallel-out shift register;

substantially simultaneously with the outputting of the first N bits stored in said first serial-in-parallel-out shift register, substantially simultaneously outputting the M bits stored in said second serial-in-parallel-out shift register, each to an input of one of a second set of M optical transmitters, each of said M optical transmitters transmitting on a different wavelength; and, multiplexing the optical outputs of said second set of optical transmitters onto said single optical transmission medium, said optical outputs of said second set of optical transmitters being spatially separated on said single optical transmission medium from the outputs of said first set of optical transmitters.

15. The method as claimed in claim 14, wherein N is equal to M.

16. A system for transmitting serial streams of electrical data bits, which comprises:

a first serial-in-parallel-out shift register including an input, said input being adapted to receive bits of a first serial stream, and a plurality of outputs, said outputs being adapted to output a first plurality of bits of said first serial data stream substantially simultaneously;

a plurality of first optical transmitters, each of said first optical transmitters being configured to transmit on a different optical wavelength, and each of said first optical transmitters including an electrical input, coupled to an output of said first serial-in-parallel-out shift register, and an optical output;

a first wavelength division multiplexer including a plurality of inputs, each of said inputs being coupled to an optical output of one of said first optical transmitters, and an output; and, first optical transmission medium coupled to the output of said first wavelength division multiplexer.

17. The system as claimed in claim 16, including:

a first wavelength division demultiplexer including an input coupled to said first optical transmission medium and a plurality of outputs;

a plurality of first optical receivers, each of said first optical receivers being configured to receive on a different optical wavelength, and each of said first optical transmitters including an optical input, coupled to an output of said first wavelength division demultiplexer, and an electrical output; and, a first parallel-in-serial-out shift register including a plurality of inputs, each of said inputs being coupled to an output of one of said first optical receivers, and an output adapted to output bits of said serial stream.

18. The system as claimed in claim 16, including:

a second serial-in-parallel-out shift register including an input, said input being adapted to receive bits of a second serial stream, and a plurality of outputs, said outputs being adapted to output a plurality of bits of said second serial data stream substantially simultaneously;

a plurality of second optical transmitters, each of said second optical transmitters being configured to transmit on a different optical wavelength, and each of said second optical transmitters including an electrical input, coupled to an output of said second serial-in-parallel-out shift register, and an optical output;

a second wavelength division multiplexer including a plurality of inputs, each of said inputs being coupled to an optical output of one of said second optical transmitters, and an output; and, second optical transmission medium coupled to the output of said second wavelength division multiplexer and to said first optical transmission medium.

19. The system as claimed in claim 18, wherein:

said first and second serial-in-parallel-out shift registers are configured to output both said first and second pluralities of bits substantially simultaneously; and, said second optical transmission medium is configured to space apart on said first optical transmission medium the outputs of first and second wavelength division multiplexers.

* * * * *